(12) United States Patent
Chen et al.

(10) Patent No.: US 7,673,069 B2
(45) Date of Patent: Mar. 2, 2010

(54) STRONG ROUTING CONSISTENCY PROTOCOL IN STRUCTURED PEER-TO-PEER OVERLAYS

(75) Inventors: Wei Chen, Beijing (CN); Xuezheng Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 11/361,534

(22) Filed: Feb. 24, 2006

(65) Prior Publication Data

US 2007/0204061 A1    Aug. 30, 2007

(51) Int. Cl.
*G06F 15/173* (2006.01)

(52) U.S. Cl. ............. 709/238; 709/203; 709/224; 709/243; 714/47

(58) Field of Classification Search ........ 709/203, 709/220–224, 238, 239, 243; 714/47
See application file for complete search history.

(56) References Cited

U.S. PATENT DOCUMENTS

| | | | |
|---|---|---|---|
| 6,651,242 B1 * | 11/2003 | Hebbagodi et al. ........ 717/127 |
| 6,728,781 B1 * | 4/2004 | Aguilera et al. ........... 709/240 |
| 6,959,323 B1 * | 10/2005 | Tzeng et al. ............... 709/205 |
| 7,185,236 B1 * | 2/2007 | Moser et al. ............... 714/47 |
| 2003/0041057 A1 * | 2/2003 | Hepner et al. ............. 707/4 |
| 2003/0074402 A1 * | 4/2003 | Stringer-Calvert et al. .. 709/203 |
| 2003/0083086 A1 * | 5/2003 | Toyryla et al. ............ 455/518 |
| 2004/0010616 A1 * | 1/2004 | McCanne .................. 709/238 |
| 2004/0044727 A1 * | 3/2004 | Abdelaziz et al. .......... 709/203 |
| 2004/0181607 A1 * | 9/2004 | Xu et al. .................. 709/239 |
| 2005/0108203 A1 * | 5/2005 | Tang et al. ................ 707/3 |

OTHER PUBLICATIONS

Liu, X. et al., "Consistency maintenance in dynamic peer-to-peer overlay networks", Aug 2005, Computer Direct.*
Fahrenholtz D. et al., "A Tree-based DHT Approach to Scalable Weakly Consistent Peer-to-Peer Data Management", 2004, Proceedings of the 15th International Workshops on Database and Expert Systems Applications.*
Wang G. et al., "A protocol for partitionable group membership service in mobile Internet", 2005, Wiley InterScience.*
Chandra et al., "Unreliable Failure Detectors for Reliable Distributed Systems", 1996, ACM.*
Keidar, I. et al., "Moshe: A group Membership Service for WANs", Aug. 2002, ACM Transactions on Computer Systems (TOCS).*
Vicente, P. et al., An Indulgent Uniform Total Order Algorithm with Optimistic Delivery:, 2002, IEEE.*

(Continued)

*Primary Examiner*—Oanh Duong
(74) *Attorney, Agent, or Firm*—Klarquist Sparkman, LLP

(57) ABSTRACT

A structured peer-to-peer overlay performs a key-based routing (KBR) that achieves a strong routing consistency guarantee as well as reasonable scalability. The key space of the structured overlay is partitioned into zones, each separately managed by a group membership service that provides total ordering of membership query and change actions. The strongly consistent KBR has two phases: first, a key value is routed to a contact node in its zone via a weakly consistent KBR protocol; and then performing a lookup of the destination node for the key value by the contact node using the group membership service of the zone. By appropriately tuning the zone size, the strongly consistent KBR balances the trade-off between scalability and routing liveness. The KBR can maintain this balance by merging and splitting zones to account for system churn and scale changes.

20 Claims, 5 Drawing Sheets

OTHER PUBLICATIONS

Hadzilacos, V. et al., "A Modular Approach to Fault-Tolerant Broadcasts and Related Problems", May 1994, Department of Computer Science.*

Zhang et al, "Reperasure: replication protocol using erasure-code in peer-to-peer storage network," Reliable Distributed Systems, 2002. Proceedings. 21$^{st}$ IEEE Symposium on Oct. 13-16, 2002 pp. 330-335.*

Birman, Kenneth P., "The Process Group Approach to Reliable Distributed Computing", Communications of the ACM, vol. 36, No. 12, Dec. 1993.

"Proceedings of the General Track: 2004 USENIX Annual Technical Conference", The USENIX Association, Jun. 27-Jul. 2, 2004.

Rowstron, et al., "Pastry: Scalable, decentralized object location and routing for large-scale peer-to-peer systems", Proc. Of the 18$^{th}$ IFIP/ACM International Conference on Distributed Systems Platforms, Heidelberg, Germany, Nov. 2001.

Stoica, et al., "Chord: A Scalable Peer-to-Peer Lookup Service for Internet Applications", SIGCOMM'01, San Diego, California, Aug. 27-31, 2001.

Van Renesse, et al., "Horus: A Flexible Group Communication System", Communications of the ACM, vol. 39, No. 4, Apr. 1996.

* cited by examiner

Figure 4

```
On node x:
1       To execute s-lookup(k):
2           y ← w-lookup(k);
3           if y = ⊥ or y ∉ Z(k) then return ⊥;
4           send message (SLOOKUP, k) to y;
5           wait until [received (SLOOKUPACK, *) or timed out];
6           if received (SLOOKUPACK, z, kver) then
7               return (z, kver) else return ⊥;

8       On receive (SLOOKUP, k) from a node y:
9           v ← getCV();
10          if v ≠ ⊥ then
11              z ← selectNode(v.set, k);
                        {select a node from the current view}
12              send (SLOOKUPACK, z, v.ver) to y;
```

400

Software 580 Implementing P2P System
With S-KBR

STRONG ROUTING CONSISTENCY PROTOCOL IN STRUCTURED PEER-TO-PEER OVERLAYS

BACKGROUND

Peer-to-peer (P2P) systems have been popularized by Internet file-sharing applications, and also have gained significant attention among researchers due to their capability to provide a scalable alternative to more traditional client-server approaches with lower cost.

In peer-to-peer systems based on structured overlays, each peer maintains a routing table that contains a partial list of other peers in the system, such that the routing tables of the peers collectively form an overlay topology. Structured overlays support key-based routing functionality, which means that given a key, the overlay can route the key to a destination defined to host this key. Key-base routing is used to build important distributed data structures, such as distributed hash tables, and to support peer-to-peer applications such as peer-to-peer storage and peer-to-peer multicast applications. The overlay topologies are designed with certain properties so that key-based routings on the topologies are efficient.

Besides routing efficiency, it is also important that the key-base routing implementation also provide a routing consistency guarantee, by which we mean that the overlay should consistently route the same key to the same destination no matter where the routing is initiated. Routing consistency is important for applications. For example, in a P2P storage application, if the routings are not consistent, a read request to an object may be routed to a wrong destination, causing a read failure or retries or other extra system repair actions. So providing routing consistency can reduce errors and maintenance cost of the applications.

To guarantee routing consistency, we need a correct overlay topology that satisfies the properties as designed. However, maintaining a correct overlay topology is not an easy task because of the highly dynamic natures of P2P systems. Most P2P systems have a large number of peers across wide area networks with unstable connections, and peers join and leave the system at any time, which is referred to as system churn. These dynamic changes of the system may lead to incorrect overlay topologies and cause inconsistent routing results.

Early peer-to-peer system protocols were not good at handling system churn. When the system churn is high, many routings either fail or return inconsistent results or incur long latency due to timeouts and retries. For example, when a large number of peers enter or leave the system at around the same time, which is referred to as flash crowds, the overlay topology could be damaged significantly. Existing proposals do not address this case in detail.

In addition to churns, network failures also cause incorrect overlay topologies. For example, when the IP layer routing failover speed after link failures is very slow, then the recovery from the incorrect overlay topology may also be slow. Moreover, if a backbone link fails and the failover is slow, the network may be partitioned, which may lead to partitions of overlay topologies and inconsistent routing results between different partitioned components.

Moreover, existing peer-to-peer system protocols may lead to an incorrect steady state, called loopy state, which causes inconsistent routing results and cannot be recovered by the basic protocol. A separate loopy detection and removal mechanism may be applied to recover a topology from the loopy state, but the recovery process is O(N) where N is the number of peers in the system. Therefore, the loopy state should be avoided as much as possible.

Overview of Structured P2P Overlays

In a structured P2P overlay, a large circular or linear key space is introduced first and each node chooses a unique key from the key space as its ID. In one example, each node chooses a unique numerical value as its ID and all nodes are sorted in a circular key space of 160 bits.

Nodes in the system can post messages with a destination key drawn from the same key space. The message is routed to a destination node based on the relationship between the destination key and the node ID. In one example, the message will be delivered to the node whose ID is the numerically closest one to the message destination key. In another example, each node owns the zone that starts from its predecessor's ID (exclusive) to its own ID in a circular key space, and the message is routed to the node whose zone contains the message destination key. Such message forwarding behavior based on the destination key is called key-based routing.

Each node in the system maintains a routing table, which contains a subset of nodes to which this node may forward messages for routing purpose. The routing tables on all nodes together form the overlay routing topology, which needs to satisfy certain constraints in order to provide correct and efficient key-based routing in the overlay.

In some implementations, each routing table is divided into two parts: the leafset table 120 and the finger table 130 as shown in FIG. 1. The leafset table remembers the logical neighbors of the node (e.g., node A 110) in the key space, which are the nodes whose IDs are closest to the ID of the node. In one example, the node's leafset table is the union of its predecessor and successor list. In the illustrated example, each node remembers L immediate preceding nodes and L immediate succeeding nodes in its leafset table.

Besides the leafset table, each node also maintains a finger table 130 to improve message routing performance. Different from the leafset table, the finger table remembers nodes that are relatively far away in the ID space. They are selected according to certain criteria to support efficient routing. In one example, the finger table consists of nodes that are $2^i$ distance away in the clockwise distance for different values of i. In another example, a node's finger table is called "routing table" and it remembers nodes that have common prefixes of specific lengths with the local node.

Key-based routing in these overlays typically consists of first routing through the finger tables to forward a message quickly to the neighborhood of the destination, and then routing through the leafset to locate the final destination. Most of the proposals have O(log N) as the routing table size and support O(log N) routing performance, where N is the system scale.

For routing consistency, leafset tables play a key role because they are used to locate the final destination in the process of key-based routing. Furthermore, leafset table maintenance is responsible of detecting node joins and leaves in the system. Therefore, the correctness of the leafset tables is the prerequisite of the routing consistency.

The content of a correct leafset table is determined by the geometry of the key space, the sorting rule of the keys in the key space and the current online nodes in the system. For instance, in a circular key space in which keys are sorted numerically, a node's leafset table must contain node entries with IDs numerically closest to the local node in the key space. Since the key space is circular, leafset tables of all nodes in the system resembles a ring topology.

Enforcing Routing Consistency

Routing consistency in structured P2P overlays is the property ensuring that routings with any given key always reach the correct node mapped by the key (a.k.a. the owner of the key). Unfortunately, most existing protocols only provide best-effort routing and do not guarantee this property. As a result, routings are sometimes erroneous. These routing errors become more frequent when churns and failures drive routing tables of nodes into inconsistent states. Some routing errors are difficult to correct and may exist for a long time.

Routing errors may decrease the performance of KBR-based applications or cause application errors. For example, applications using distributed hash tables to store key-value pairs may falsely report a stored key to be lost when routing to a wrong node, or start unnecessary replication maintenance. It is difficult for individual applications to build complex distributed data structures and systems on top of an inconsistent and error prone routing layer. To a certain extent, this makes structured P2P overlays less competent as a widely applicable building block for distributed systems.

On the other hand, some group membership and group communication systems have made significant advances in supporting strong consistency in dynamic systems. These systems, however, are only appropriate for cluster environments and are not scalable to large scale and more dynamic P2P environments.

If we look at KBR routing consistency as a continuous spectrum, existing KBR protocols are at the weakest end since they are best-effort and lack the routing consistency guarantee. While the traditional group membership protocols are at the strongest end, because they maintain a consistent view over entire membership and KBR is reduced to one-hop membership lookup. Both extremes have their own drawbacks: the weakest end has no consistency guarantee desired by applications while the strongest end is not scalable.

SUMMARY

The following Detailed Description presents a key-based routing technique and its implementation in structured P2P overlay systems and methods. This key-based routing technique more appropriately balances the tradeoff between consistency and scalability for structured P2P overlay-based applications.

The new routing technique described herein implements strongly consistent KBR. This KBR provides the strong consistency guarantee as well as reasonable scalability. Implementations of this routing technique can provide a continuum of consistency levels with a tunable parameter, by which applications can select the appropriate consistency level and avoid complicated designs to tolerate routing errors. Our work makes KBR suitable as a general building block for many applications and potentially broadens the usage of structured P2P overlays.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

BRIEF DESCRIPTION OF THE DRAWINGS

FIG. 4 is a pseudo-code listing of a procedure for strongly consistent key-based routing.

DETAILED DESCRIPTION

The following description relates to implementations of key-based routing techniques that provide a strong consistency guarantee and scalability in structured P2P overlay systems. Although the following description illustrates the inventive routing techniques in the context of structured P2P overlay systems, it should be understood that this approach also can be applied to more generally to perform routing functions in distributed systems.

1. Specifying Routing Consistency

In the following section, we start by first rigorously specifying and enhancing routing consistency in structured P2P overlays. We define two levels of routing consistency, namely weakly consistent KBR that eventually achieves routing consistency, and strongly consistent KBR that provides consistency guarantees even before the system is stable. Based on these specifications, designers of P2P applications can clearly understand and avoid misuse of routing functionality, as well as make formal proofs on their algorithms.

2 Key-Based Routing Specification 2.1 System Model

We consider a peer-to-peer system consisting of nodes (peers) drawn from the set, $\Sigma = \{x_1, x_2, x_3, \ldots\}$. We treat time as discrete with the range T. Nodes may join or leave the system at any time. A membership pattern is a function $\Pi$ from T to $2^\Sigma$, such that $\Pi(t)$ denotes the set of nodes in the system at time t, and it is always finite. A membership pattern $\Pi$ is eventually stable if there is a time $t_0$ such that $\Pi(t)$ does not change for all $t \geq t_0$. If $\Pi$ is eventually stable, let sset($\Pi$) be the set of nodes that are eventually alive in the system, and let stime($\Pi$) be the earliest time such that the membership pattern does not change any more.

Nodes communicate by asynchronous message passing over communication links. Messages sent are assumed to be unique. Messages cannot be created or duplicated by the links, and they are reliable in the sense that if both the sender and the receiver keep alive after the send event of a message, then the message will be received by the receiver eventually. The system is eventually stable if there is a time after which the membership pattern is stable, and there is a link between any pair of nodes remaining in the system, and all messages can be delivered to the recipients within a certain time bound. Eventual stability of the system is only needed to guarantee liveness properties of the specifications.

2.2 Group Membership Service

Figure 1:
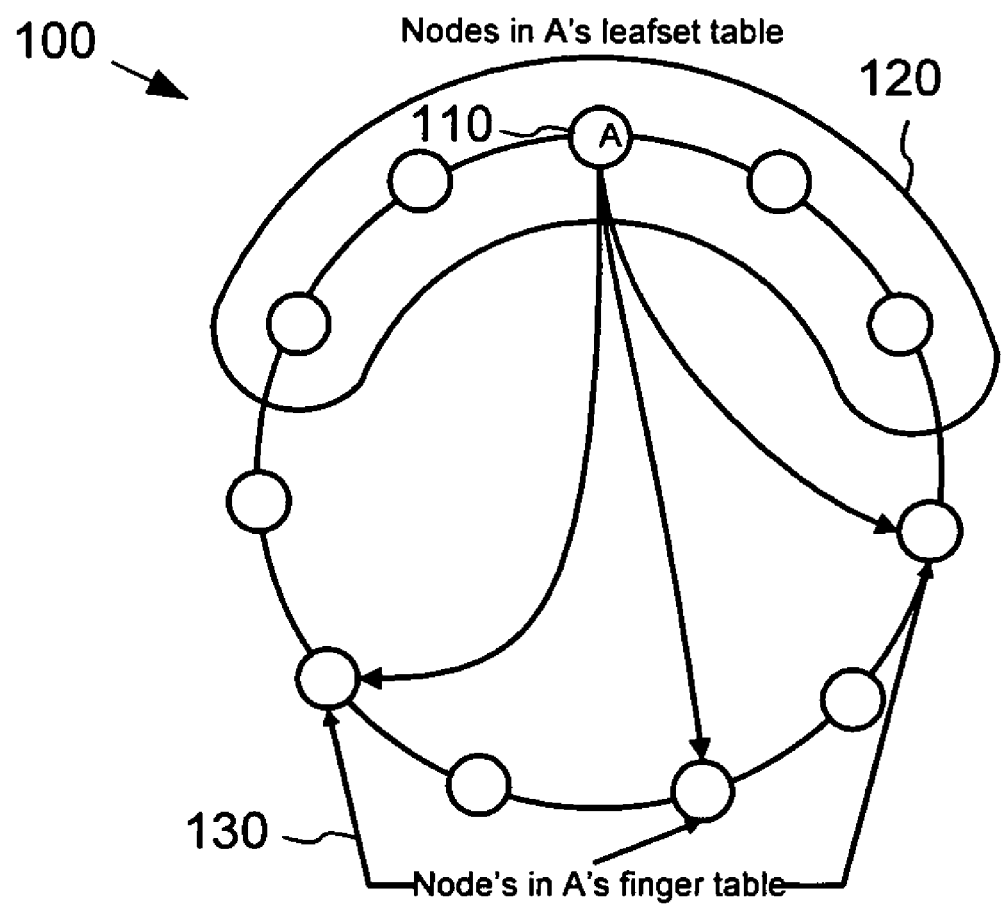
FIG. 1 is a block diagram illustrating a structured P2P overlay system using KBR with a leafset table and finger table in the prior art.
Figure 2:
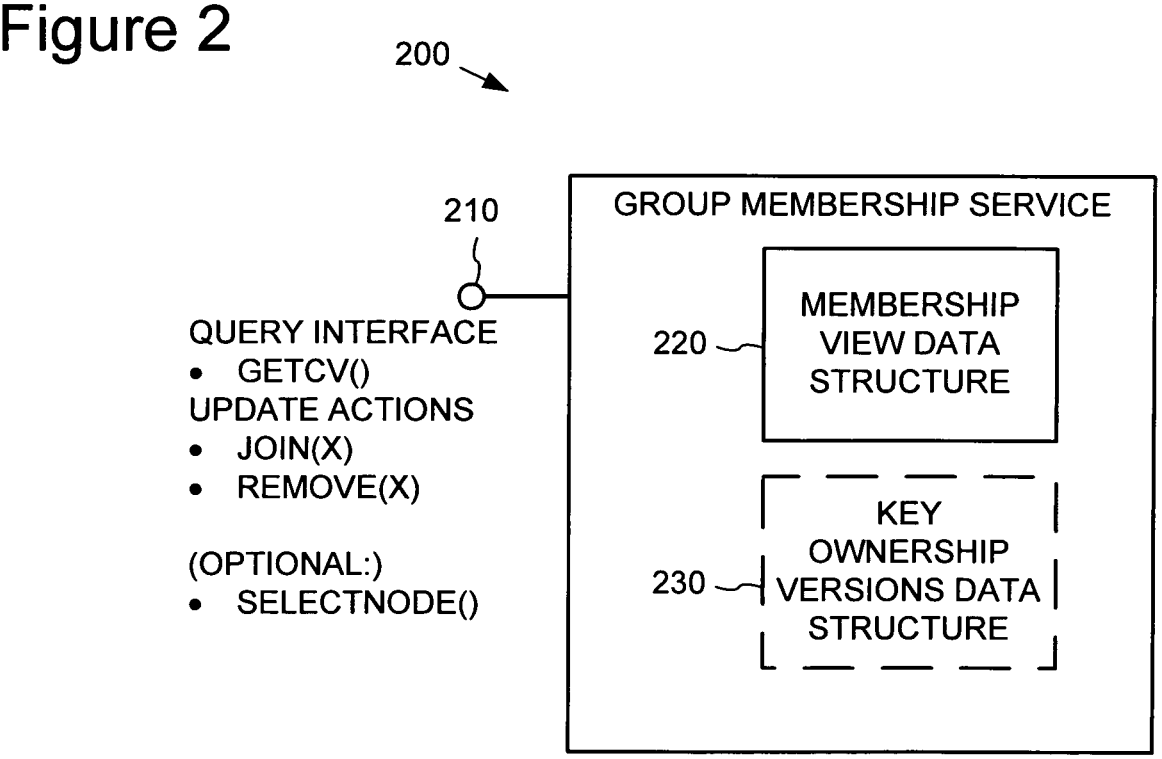
FIG. 2 is a block diagram of a group membership service for use in an implementation of strongly-consistent key-based routing.

For the purpose of supporting strongly consistent KBR (described below), a group membership service (GMS) 200 (illustrated in FIG. 2) provides a query interface 210 to membership views and the queries are totally ordered together with membership change events. This total ordering provides causality between different queries, which is usually not required in previous GMS specifications.

GMS 200 maintains a membership view v=(set, ver) 220 where v.set $\subset \Sigma$ is a finite set of nodes and v.ver is a non-negative integer indicating the version of the view. A node in the system queries the current membership view by invoking the interface action getCV( ). Action getCV( ) always has a return value, which is either a valid view or $\perp$ indicating that the node is not yet in the view or the query failed. The membership view is updated by two internal actions join(x) and remove(x). Action join(x) is initiated by a new node x joining the system, and it adds node x into the membership view. Action remove(x) is initiated by nodes that detect the failure of node x, and it removes x from the view. Both actions also increment the view number. GMS totally orders all getCV( ), join( ) and remove( ) actions to provide consistency guarantee on the view membership. Important properties that GMS satisfies include (but may not be limited to):

Causality Consistency: If node $x_1$ and $x_2$ each invokes a getCV( ), and the return of getCV( ) on $x_1$ is causally before the invocation of getCV( ) on $x_2$, and the return values are two views $v_1$ and $v_2$, respectively, then $v_1.\text{ver} \leq v_2.\text{ver}$.

Agreement: For any two views v and w returned by get CV( )'s, if v.ver=w.ver, then v.set=w.set.

Eventual Convergence: If membership pattern $\Pi$ is eventually stable, then there is a view v such that v.set=sset($\Pi$) and for any node X$\in$sset($\Pi$), there is a time $t_1 \geq \text{stime}(\Pi)$ such that if x invokes getCV( ) after time $t_1$, the return value is v.

Causality Consistency is a safety property ensuring that the causality of the query events is consistent with the increment of the view numbers. Agreement is another safety property ensuring view consistency as long as version numbers agree. Eventual Convergence is the liveness property ensuring that GMS will converge to a single view that matches the live nodes in the system provided that the membership becomes stable eventually.

GMS with the above properties can be implemented by extending various existing techniques, such as consensus (as described by M. F Fischer, N. A. Lynch, and M. S. Paterson, "Impossibility Of Distributed Consensus With One Faulty Process," *Journal of the ACM*, 32(2):374-382, April 1985) or causal atomic broadcast primitives (described by V. Hadzilacos and S. Toueg, "A Modular Approach To Fault-Tolerant Broadcasts And Related Problems," *Technical Report* 94-1425, Department of Computer Science, Cornell University, May 1994), to totally order all actions, and using eventually perfect failure detectors (described by T. D. Chandra and S. Toueg, "Unreliable failure detectors for reliable distributed systems," Journal of the ACM, 43(2):225-267, March 1996) to ensure view convergence to the actual set of nodes remaining in the system.

2.3 Weakly Consistent KBR Specification

Each node X$\in\Sigma$ has a unique id x.id, drawn from a key space K. When the context is clear, we use x to represent x.id. Weakly consistent KBR (W-KBR for short) has one primitive w-lookup(k), where k is a key value from the same space K. A node uses this primitive to find out the node that owns the key k. In large and dynamic P2P systems where a node cannot store the entire membership list of the system, w-lookup( ) is typically implemented by multihop routing. The w-lookup( ) primitive either returns a $\perp$ value indicating the failure of the lookup, or a node x (including its id x.id and its physical address x.address for future communication).

Informally, W-KBR means that routings are eventually consistent when the system is stable for a long enough period, but they may not be consistent when the system is not stable. More rigorously, it needs to satisfy the following properties.

Eventual Progress: If membership pattern $\Pi$ is eventually stable, then there is a time $t_1 \geq \text{stime}(\Pi)$ such that for any key k$\in$K, if a node x$\in$sset($\Pi$) invokes w-lookup(k) after $t_1$, then the return value must be some y$\in$sset($\Pi$).

Eventual Consistency: If membership pattern $\Pi$ is eventually stable, then there is a time $t_1 \geq \text{stime}(\Pi)$ such that for any key k$\in$K, if two nodes $x_1$, $x_2 \in$sset($\Pi$) invoke w-lookup(k) after time $t_1$ and the return values are $y_1$, $y_2 \in \Sigma$, respectively, then $y_1 = y_2$.

The Eventual Progress property requires that eventually all routings should successfully return a node instead of $\perp$, and the node returned should be a live node in the system. The Eventual Consistency property requires that eventually all routings with the same key will find the same node. Both properties assume that the membership is eventually stable, and together they imply that eventually every key is owned by exactly one live node in the system.

2.4 Strongly Consistent KBR Specification

Intuitively, strongly consistent KBR (S-KBR for short) should guarantee that routings with the same key always reach the same destination no matter where the routing is started. This, however, has to be modified since the destination may changes overtime due to node leaves and joins. To deal with changes, we add a version number to the routing results. Informally, the version number tells that the returned destination is the owner of the key during this version. The version number increases when the owner of the key changes overtime.

More specifically, S-KBR uses routing primitive s-lookup (k), which returns either $\perp$ or (x, kver), where x is a node and kver is a non-negative integer. S-KBR needs to satisfy the following properties.

Causality Consistency: If node $x_1$ and $x_2$ invoke s-lookup (k) and get return values $(y_1, \text{kver}_1)$ and $(y_2, \text{kver}_2)$ respectively, and the return of $x_1$'s invocation is causally before the $x_2$'s invocation, then $\text{kver}_1 \leq \text{kver}_2$.

Strong Consistency: If two nodes $x_1$ and $x_2$ invoke s-lookup (k) and receive return values $(y_1, \text{kver}_1)$ and $(y_2, \text{kver}_2)$ respectively, and $\text{kver}_1 = \text{kver}_2$, then $y_1 = y_2$.

Eventual Stability: If membership pattern $\Pi$ is eventually stable, then there is a time $t_1 \geq \text{stime}(\Pi)$ such that for every k$\in$K, there is a version number $m_k$, for every node x$\in$sset($\Pi$), if x invokes s-lookup(k) after time $t_1$, the return values must be non-$\Pi$, and the version number in the return value is $m_k$.

Causality Consistency requires that the increment of version numbers is consistent with causality. Strong Consistency requires that as long as the two routings of the same key have the same version number, they will have the same destination. This property is meant to hold at all times, which is different from the Eventual Consistency property of W-KBR. One may argue that an implementation can get around the Strong Consistency property by returning different version numbers for every return values or returning failures. This, however, is constrained by the Eventual Stability property that does not allow indefinite increments of version numbers or indefinite failure returns if the membership is eventually stable. Since the implementation does not know when the system is stable, it has to try to reach strong consistency at all times.

The above properties can be matched with properties of GMS in Section 2.2, which indicates that the two problems are related.

3 S-KBR Implementation

S-KBR can be simply built on top of a global GMS: the routing source obtains a global membership view and then calculates the destination based on the key and the membership view. Causality, consistency and liveness properties are guaranteed by GMS. The key issue, however, is that GMS is not scalable enough to handle the scale and dynamic changes of P2P systems. The way to deal with the issue is to partition the nodes into multiple components, each of which is managed by a separate GMS.

Figure 3:
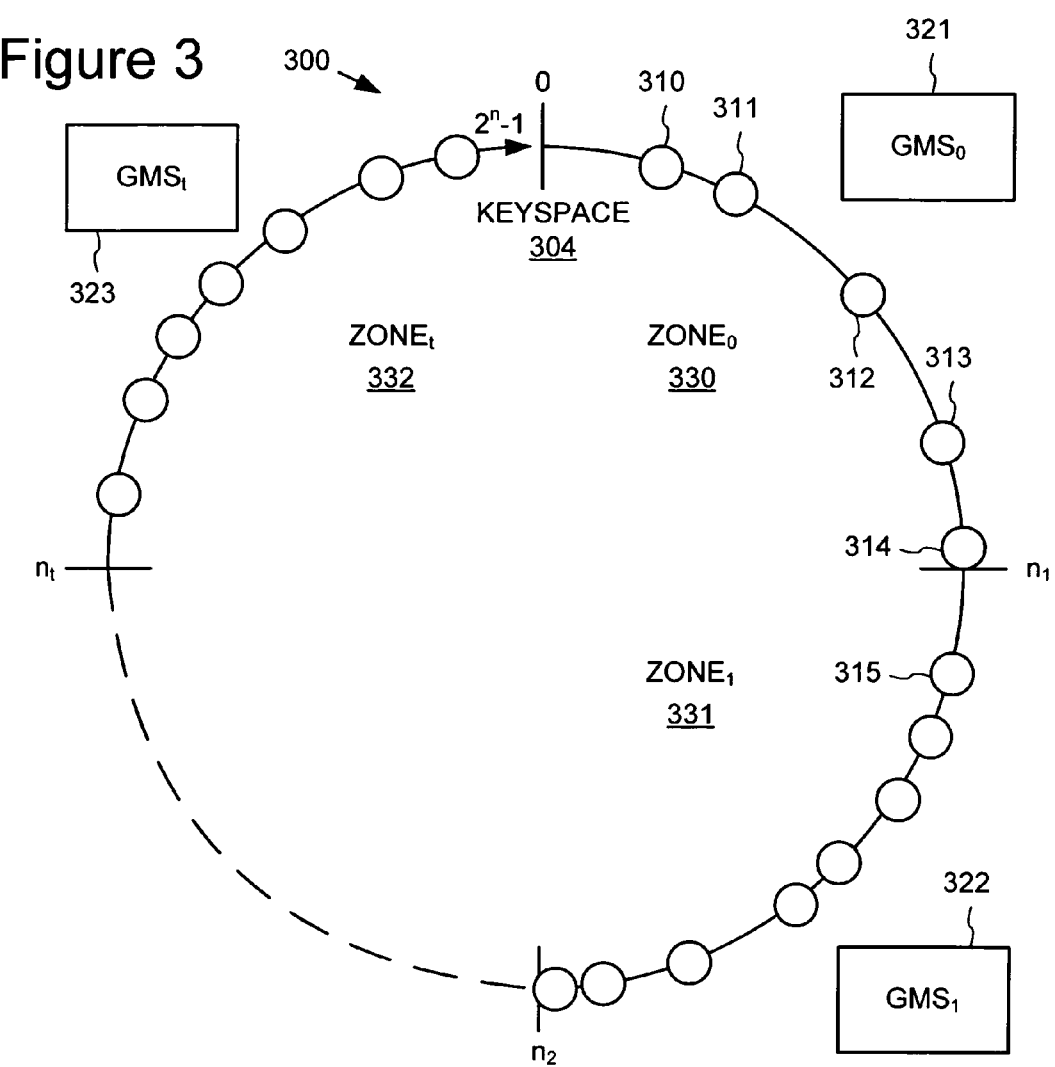
FIG. 3 is a diagram of a structured peer-to-peer overlay system having nodes partitioned into zones with group membership services for strongly consistent key-based routing.

In one example implementation of a structured peer-to-peer overlay system 300 supporting S-KBR shown in FIG. 3, the key space 304 of the system 300 can be a one dimensional circular space on integers from 0 to $2^n-1$ for some integer n. However, other key spaces alternatively can be used. As discussed previously, nodes 310-315 that join the system 300 take their node ids from this key space 304. The key space 304 is statically partitioned into a number of zones 330-332, $(0, n_1], (n_1, n_2], \ldots, (n_1, 0]$. In other implementations, the number of zones into which the key space is partitioned can vary dynamically, such as by use of the zone mergers and splits procedure discussed below. We denote Z as a zone partition of the key space K, and for any key k, Z(k) represents the zone that covers the key k. The system 300 includes a separate group membership service (GMS) 320-322 per zone. Each GMS provides a query interface as described in the section 2.2 above. Nodes whose ids fall into the same zone (e.g., the nodes 310-314 in zone 330) form a group and are managed by the GMS for the zone. Zone size is a tunable parameter that controls the tradeoff between scalability and consistency, and we will discuss it in Section 4.1.

FIG. 4 shows a pseudo-code listing of a procedure 400 to implement the S-KBR, which has two phases. In the first phase, the key k is routed to a node in the target zone Z(k). This routing can be done by a variant of W-KBR that requires that eventually routings with key k always fall into the target zone Z(k) (this property is stronger than the Eventual Progress property of W-KBR defined above), but they do not necessarily end up in the same node (weaker than the above-defined Eventual Consistency property of W-KBR). As a result, we need to require that eventually every zone contains some node in the system, which is discussed in Section 4 below. Existing KBR protocols are usually sufficient to be used as such a W-KBR variant in practice. In the second phase of routing, once a key is routed into a node within the target zone, the node queries the zone's GMS to retrieve the current view of the zone. Based on the view and the key, the node calculates the destination node and returns it with the version number of the zone as the routing result. If a node within the target zone cannot be located in the first phase, the routing returns failure. This is the situation where the illustrated S-KBR procedure chooses to sacrifice liveness to maintain strong routing consistency.

Since each zone has its own GMS to manage the membership within the zone, there is an issue on how a new node joining the system locates its zone's GMS. This bootstrap problem can be solved by a separate bootstrap service that connects nodes with its GMS, or it can be solved by the same W-KBR variant we used in the first phase of S-KBR routing. When a node is joining the system, it uses its own id as the routing key and uses the W-KBR variant to route its own id to a contact node in its zone. Since the W-KBR variant guarantees that eventually it will route the key to a node in the same zone, this bootstrap will be successful eventually.

The following theorem states the correctness of the illustrated S-KBR procedure.

Theorem 1 Under the condition that the GMS and W-KBR variant satisfy their own properties specified, the procedure in FIG. 3 satisfies the Causality Consistency and Strong Consistency properties of S-KBR. Moreover, if the system is eventually stable, the algorithm also satisfies the Eventual Stability property.

The above assumes eventual stability of the system for the liveness property. The safety properties, namely Causality Consistency and Strong Consistency, do not rely on eventual stability of the system and they hold for any asynchronous systems.

In the basic procedure, the version number of any key in a zone changes as soon as the zone version changes. We can reduce key version number changes to improve routing consistency guarantee by the following two steps. With reference again to FIG. 2, we first define a stable selectNode( ) function such that most keys' version numbers do not change as view changes. Second, in addition to maintaining a zone membership view 220, the GMS 200 also maintains a data structure 230 to record key ownership versions and use it for routing return values instead of the zone version number.

4 Discussion

The previous section provides the procedure that is proven to support S-KBR. However, to make the basic procedure applicable in dynamic P2P environments, a number of issues need to be addressed. This section presents extensions of the procedure to address these issues.

4.1 Zone Size Determination

Zone size is the tunable parameter that determines the tradeoff between scalability and routing consistency (or routing liveness). With the assumption that node ids are randomly generated and equal-sized zones are used, then each zone contains roughly the same number of nodes (unbalanced zones are dealt with in the next section). With a larger zone size, each zone contains more nodes, and thus more first phase routings with the W-KBR variant will fall into the target zone, leading to a successful and consistent routing result. But, the choice of large zone size also increases the GMS query and maintenance cost and reduces scalability. In the extreme case where the entire key space is covered by a single zone, the algorithm is reduced to the global GMS based algorithm. A smaller zone size is just the opposite, and the extreme is that each zone only covers one node and the algorithm is essentially reduced to a W-KBR algorithm. Therefore, tuning the zone size provides a continuum of consistency levels from weak consistency to strong consistency. We anticipate that few tens of nodes in each zone may be appropriate to balance between scalability and consistency in many applications.

4.2 Zone Merges and Splits

System churns or system scale changes may cause some or all zones in the system become overloaded or underloaded. To keep the number of nodes within each zone at the same level as determined by the consistency to scalability tradeoff, some S-KBR implementations can re-partition the key space into fewer or more zones, such as by use of zone merges and splits. In particular, when a zone becomes overloaded, the S-KBR procedure splits the zone in halves; when a zone becomes underloaded, S-KBR merges the zone with neighboring zones.

To maintain routing consistency, S-KBR needs to maintain correct versions when the zone changes. The idea is that instead of having one static zone Z(k) for a key k, we have a sequence of zones $Z_1(k), Z_2(k), \ldots$ for key k, following the causal order of merges and splits. The version numbers along the sequences of zones associated with key k is monotonically increasing. This can be achieved by always using larger version numbers for the new zones after merges or splits.

Another important issue is that zone merges have to be agreed upon all relevant zones. Otherwise, it may result in inconsistency in zone partition. Such agreement can be achieved by running consensus among zones, effectively enforcing consistency at a higher and inter-zone level. This leads to a hierarchical design in which a small number of centralized servers are at the top level enforcing global consistency, but they are only needed when consistency cannot be resolved at lower levels, and thus they are rarely needed. The lower levels are more decentralized and maintain local consistency at a manageable scale. Moreover, an actual implementation may choose to remove the higher levels of the hierarchy to sacrifice global consistency in some rare cases for a more decentralized and scalable solution.

4.3 Dead Zones

A zone cannot make any progress and becomes dead when a majority of nodes in the zone are dead before the GMS of zone takes any action. When a zone becomes dead, we need to remove it and reactivate the zone, otherwise, any routing with a key in the zone will not be successful. This is the zone bootstrap problem, and it can be dealt with using the same hierarchical design for zone merges and splits. Each zone is monitored by a number of other zones and consensus is run among these zones for removing and reactivating a dead zone.

6. Computing Environment

The above-described strong consistency guarantee, key-based routing techniques can be realized on any of a variety of peer-to-peer distributed systems, composed of nodes that may include among other examples, computers; cell phones or other communications devices; game consoles, media players and other entertainment devices; and etc. The S-KBR techniques can be implemented in hardware circuitry, in firmware, operating system, as well as in peer-to-peer application software executing within a computer or other computing environment, such as shown in FIG. 5.

Figure 5:
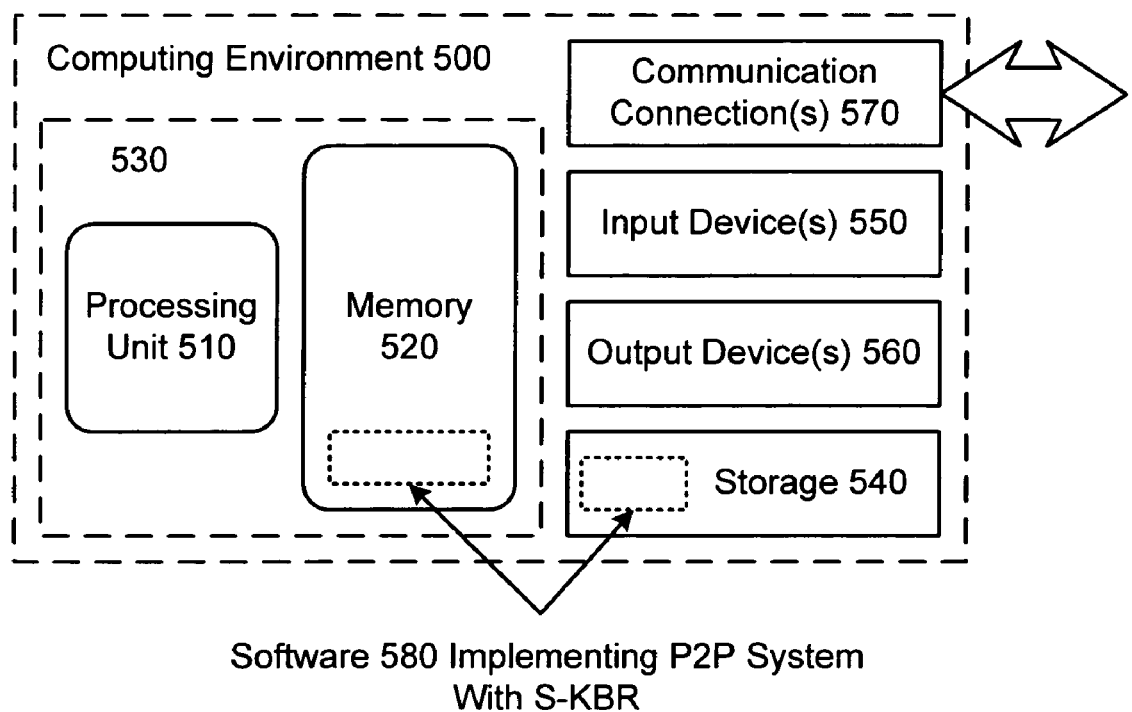
FIG. 5 is a block diagram of a suitable computing environment for implementing peer nodes of the structured peer-to-peer overlay system of FIG. 3.

FIG. 5 illustrates a generalized example of a suitable computing environment (500) in which various nodes and the group membership service of individual zones of the described structure peer-to-peer overlay system 200 (FIG. 3) may be implemented. The computing environment (500) is not intended to suggest any limitation as to scope of use or functionality of the invention, as the present invention may be implemented in diverse general-purpose or special-purpose computing environments.

With reference to FIG. 5, the computing environment (500) includes at least one processing unit (510) and memory (520). In FIG. 5, this most basic configuration (530) is included within a dashed line. The processing unit (510) executes computer-executable instructions and may be a real or a virtual processor. In a multi-processing system, multiple processing units execute computer-executable instructions to increase processing power. The memory (520) may be volatile memory (e.g., registers, cache, RAM), non-volatile memory (e.g., ROM, EEPROM, flash memory, etc.), or some combination of the two. The memory (520) stores software (580) implementing the described structured peer-to-peer overlay system with strongly consistent, key-based routing.

A computing environment may have additional features. For example, the computing environment (500) includes storage (540), one or more input devices (550), one or more output devices (560), and one or more communication connections (570). An interconnection mechanism (not shown) such as a bus, controller, or network interconnects the components of the computing environment (500). Typically, operating system software (not shown) provides an operating environment for other software executing in the computing environment (500), and coordinates activities of the components of the computing environment (500).

The storage (540) may be removable or non-removable, and includes magnetic disks, magnetic tapes or cassettes, CD-ROMs, CD-RWs, DVDs, or any other medium which can be used to store information and which can be accessed within the computing environment (500). The storage (540) stores instructions for the software (580) implementing the described strongly consistent, key-based routing.

The input device(s) (550) may be a touch input device such as a keyboard, mouse, pen, or trackball, a voice input device, a scanning device, or another device that provides input to the computing environment (500). For audio, the input device(s) (550) may be a sound card or similar device that accepts audio input in analog or digital form, or a CD-ROM reader that provides audio samples to the computing environment. The output device(s) (560) may be a display, printer, speaker, CD-writer, or another device that provides output from the computing environment (500).

The communication connection(s) (570) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The described S-KBR techniques herein can be described in the general context of computer-readable media. Computer-readable media are any available media that can be accessed within a computing environment. By way of example, and not limitation, with the computing environment (500), computer-readable media include memory (520), storage (540), communication media, and combinations of any of the above.

The described S-KBR techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of enforcing routing consistency among peer computing device nodes on a network organized in structured peer-to-peer overlays, the method comprising:

partitioning a key space of a structured peer-to-peer overlay having a plurality of computing device nodes into a plurality of zones, wherein at least one of the zones encompasses keys of more than one of said computing device nodes;

providing a group membership service by one of said computing device nodes per zone to manage computing device nodes of their respective zones;

performing key-based routing within the structured peer-to-peer overlay by:

performing routing of a key value via a weakly consistent key-based routing to a contact computing device node in the zone to which the key value belongs; and determining by the contact computing device node using the group membership service of the zone with a strong consistency guarantee a target computing device node to which the key value belongs in the zone, wherein said strong consistency guarantee is that determinations of which computing device node that a given key value belongs by any two computing device nodes in the zone using the group membership service yields a same result for a given version number of the zone, wherein the group membership service provides total ordering of membership queries and membership changes, and wherein the group membership service increments the version number of the zone with each membership change to the zone.

2. The method of claim 1 wherein the weakly consistent key-based routing provides a property that routing the key value eventually routes to a computing device node within the zone to which the key value belongs, but not necessarily always the same computing device node.

3. The method of claim 1 wherein the group membership service of a zone provides total ordering of membership query and membership change actions.

4. The method of claim 3 wherein the group membership service further satisfies the properties of causality consistency, agreement and eventual convergence.

5. The method of claim 4 wherein the group membership service is implemented using a consensus procedure to totally order the membership query and member change actions, and uses an eventually perfect failure detector procedure to ensure convergence of its membership view to an actual set of computing device nodes currently existing within the zone.

6. The method of claim 4 wherein the group membership service is implemented using a causal atomic broadcast primitives procedure to totally order the membership query and member change actions, and uses an eventually perfect failure detector procedure to ensure convergence of its membership view to an actual set of computing device nodes currently existing within the zone.

7. The method of claim 1 further comprising determining a zone size in which to partition the key space, such that zones each contain a desired number of computing device nodes greater than one that appropriately balances between scalability and consistency for an application implemented by the structured peer-to-peer overlay.

8. The method of claim 1 further comprising:

when a zone contains in excess of an overloaded number of computing device nodes, re-partitioning the key space into a larger number of zones; and when a zone contains less than an underloaded number of computing device nodes, re-partitioning the key space into fewer zones.

9. The method of claim 8 wherein re-partitioning into a larger number of zones comprises splitting an overloaded zone in halves, and re-partitioning into fewer zones comprises merging an underloaded zone with a neighboring zone.

10. The method of claim 1 further comprising:

detecting when a zone is dead; and reactivating the zone.

11. The method of claim 10 wherein said detecting when a zone is dead comprises detecting that a majority of computing device nodes that are members of the zone according to the group membership service of the zone are no longer live.

12. A structured peer-to-peer overlay system with strongly consistent key-based routing, the system comprising:

a plurality of computing device nodes, each computing device node having a node ID within a key space and owning a range of key values, the key space being partitioned into zones, the computing device nodes implementing a weakly consistent key-based routing protocol operating to route a query with a key value to an owning computing device node for the key value;

a plurality of group membership services each separately managing a group of computing device nodes whose node ID is contained in one of a plurality of zones into which the key space is partitioned, each group membership service providing an interface for receiving group membership query and membership change event actions from the computing device nodes with total ordering of the membership query and change event actions via a membership view version number incrementing with each membership change to the group membership service's zone;

wherein the system provides strongly consistent key-based routing of a key value by first performing routing using the weakly consistent key-based routing to a contact computing device node within the zone containing the key value, and the contact computing device node then determining using the group membership service of the zone with a strong consistency guarantee to which computing device node in the zone the key value belongs, wherein said strong consistency guarantee is that determinations of which computing device node that a given key value belongs by any two computing device nodes in the zone using the group membership service yields a same result for a given membership view version number of the zone.

13. The structured peer-to-peer overlay system of claim 12 wherein the group membership services operate to reduce key version number changes by providing a stable select node action that returns a node for a key with a key version number that updates independently of the zone version number maintained by the group membership service, the group membership service further maintaining a key ownership data structure to record the key version numbers.

14. The structured peer-to-peer overlay system of claim 12 wherein the weakly consistent key-based routing protocol conforms to a property that routing the key value eventually routes to a computing device node within the zone to which the key value belongs, but not necessarily always the same computing device node.

15. The structured peer-to-peer overlay system of claim 12 wherein the group membership services satisfy the properties of causality consistency, agreement and eventual convergence.

16. The structured peer-to-peer overlay system of claim 12 wherein the group membership services further operate on a consensus basis to split zones whose node membership is overloaded, and to merge zones whose node membership is underloaded.

17. The structured peer-to-peer overlay system of claim 12 wherein the group membership services further operate on a consensus basis to remove and reactivate a zone that becomes dead.

18. One or more computer-readable storage media having instructions stored thereon which, when executed by a computer, cause the computer to perform a method for strongly consistent key-based routing in a structured peer-to-peer overlay, the structured peer-to-peer overlay having a keyspace partitioned into zones separately managed by group membership services, the method comprising:
  upon a node joining the structured peer-to-peer overlay, issuing a join action to a group membership service for a zone to which a node ID of the node belongs;
  upon detecting failure of another node, issuing a remove action to a group membership service to which the other node belongs;
  when routing a key value:
  performing a lookup of a contact node in a zone for the key value using a weakly-consistent key-based routing protocol among nodes of the structured peer-to-peer overlay;
  issuing a strongly consistent lookup request to the contact node;
  upon receiving a strongly consistent lookup request from another requesting node, determining using the group membership service of the zone with a strong consistency guarantee an owning node for the key value in the zone, and identifying the owning node to the other requesting node, wherein said strong consistency guarantee is that determinations of which node that a given key value belongs by any two nodes in the zone using the group membership service yields a same result for a given version number of the zone, wherein the group membership service provides total ordering of membership queries and membership changes, and wherein the group membership service increments the version number of the zone with each membership change to the zone;
  failing to route the key value if the contact node in the zone cannot be located via the weakly-consistent key-based routing protocol or the group membership service query fails; and
  routing the key value to the owning node identified by the contact node.

19. The computer-readable storage media of claim 18 wherein the routing further returns a version number that satisfies causality consistency, strong consistency and eventual consistency properties of strongly consistent key-based routing.

20. The computer-readable storage media of claim 18 wherein a node joining the structured peer-to-peer overlay first performs a lookup of a contact node in a zone for its node ID using the weakly-consistent key-based routing protocol to locate the group membership service for issuing the join action.

* * * * *